United States Patent [19]
Bartimes et al.

[11] Patent Number: 5,198,247
[45] Date of Patent: Mar. 30, 1993

[54] IN-MOLD LABELLERS FOR A DUAL CAVITY MOLD

[75] Inventors: George F. Bartimes, Chicago, Ill.; Leonard A. Blomquist, Williamsburg, Va.

[73] Assignee: Continental Plastic Containers, Inc., Norwalk, Conn.

[21] Appl. No.: 607,041

[22] Filed: Oct. 31, 1990

[51] Int. Cl.$^5$ ............................................. B29C 49/24
[52] U.S. Cl. ........................... 425/503; 156/DIG. 31; 264/509; 425/504; 425/522
[58] Field of Search ....................... 425/503, 504, 522; 271/11, 90, 91, 99; 264/509; 156/DIG. 31

[56] References Cited

U.S. PATENT DOCUMENTS

| | | | |
|---|---|---|---|
| 4,355,967 | 10/1982 | Hellmer | 425/504 X |
| 4,479,644 | 10/1984 | Bartimes et al. | 264/509 X |
| 4,679,997 | 7/1987 | Plenzler e al. | 425/522 X |
| 4,838,776 | 6/1989 | Hasl | 264/509 X |
| 4,917,592 | 4/1990 | Plenzler et al. | 156/DIG. 31 |
| 5,026,266 | 6/1991 | Takasaki et al. | 264/509 X |
| 5,039,298 | 8/1991 | Takakusaki et al. | 425/504 |

*Primary Examiner*—Richard L. Chiesa
*Attorney, Agent, or Firm*—Eugene F. Friedman

[57] ABSTRACT

This relates to a labeller for applying simultaneously two labels to a dual cavity mold half. The labeller is especially constructed to receive a pair of labels from a pair of adjacent label magazines and then move one of the labels towards the other so as to reduce the overall width of the pair of labels. This permits the pair of labels to be moved between a pair of mold halves within the limited space available and thereafter be rotated for alignment with the dual cavities of the mold half for positioning within the dual cavities. Basically speaking, the labeller includes a support member having mounted thereon a pair of carriers for separate movement towards and away from one another. The carriers are moved such that one normally remains fixed after a label is picked up by pickup heads carried thereby while the other carrier is moved towards the first carrier so as to move the labels together. The labeller is mounted in offset relation away from the mold half which is to receive the labels so that the labels may now be swung into alignment with the cavities of the mold half by pivoting the labeller. After this occurs, both carriers are actuated so as to separate the labels and to align the labels with the mold cavities, after which the labeller is advanced towards the mold cavities to position the labels within the respective mold cavities.

9 Claims, 5 Drawing Sheets

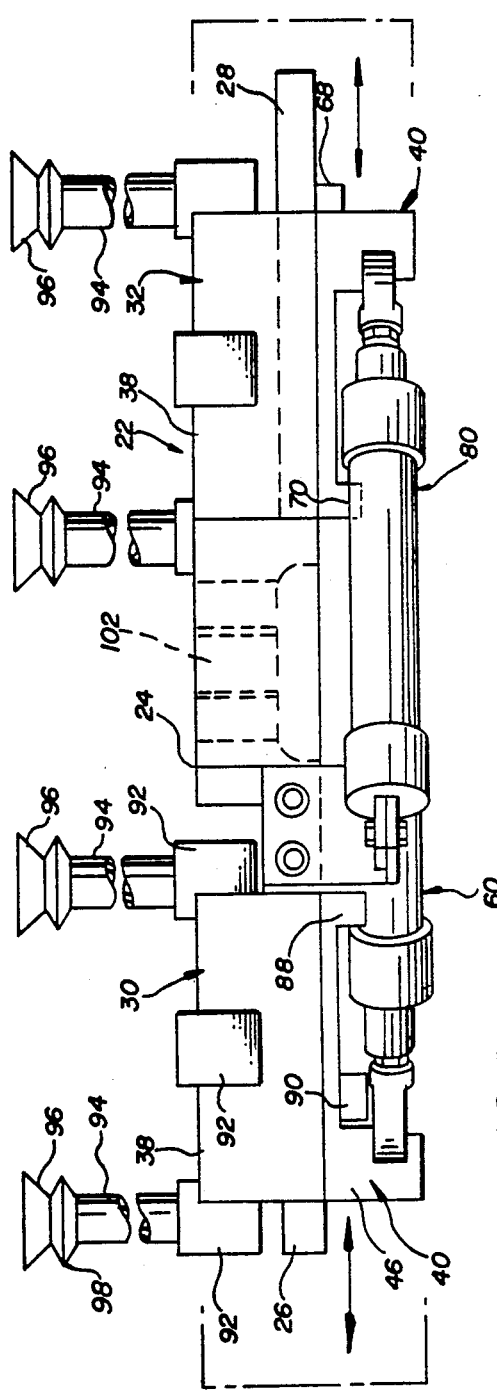
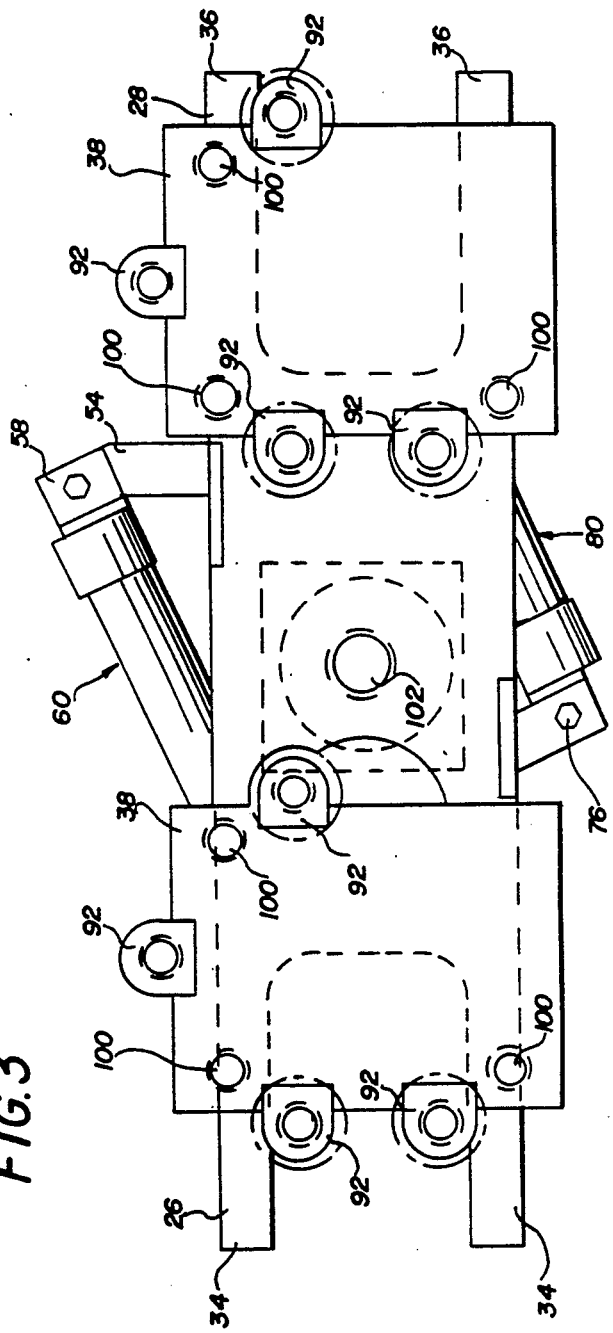

IN-MOLD LABELLERS FOR A DUAL CAVITY MOLD

This invention relates in general to new and useful improvements in the application of labels to a mold, such as a blow mold, and more particularly to the simultaneous application of two labels to a dual cavity mold half. Most particularly, the invention relates to the solution of a problem of the labels, as carried by a twin label magazine, being too wide and spaced too far from one another to be able to be moved between the open mold halves for depositing into the dual cavities of a mold half.

BACKGROUND OF THE INVENTION

It is well known to deposit labels in the cavities of open mold halves of a rotating mold. However, the mold has begun to be much larger for larger size containers and, further, the molding apparatus now uses a dual cavity mold. The net result is that the spacing combined with the size of the labels to be simultaneously placed in the dual cavities is greater than the available space between open mold halves.

SHORT DESCRIPTION OF INVENTION

In accordance with this invention, it is proposed to place the two label magazines as close together as possible, and after the label applying apparatus picks up the two labels and as the labels are being moved transversely into the space between the paths of the open mold halves, moving the labels relative to one another together. With the two labels so closely disposed adjacent one another, the two labels are then pivoted so as to face the mold half having the two cavities into which the labels are to be placed. Following this, the labels are separated to match the spacing of the cavities after which the labels are deposited within the cavities. Then as the carriers for the labels are returned to pick up the next pair of labels, the carriers are moved together into positions for again being aligned with the label magazines and picking up a new set of labels.

With the above and other objects in view that will hereinafter appear, the nature of the invention will be more clearly understood by reference to the following detailed description, the appended claims, and the several views illustrated in the accompanying drawings.

BRIEF DESCRIPTION OF THE DRAWING FIGURES

FIG. 2 is a to top plan view of the labeller of FIG. 1 and shows further details thereof.

FIG. 3 is a front elevational view of the label carrier portion only of the labeller.

DETAILED DESCRIPTION OF THE PREFERRED EMBODIMENT

Figure 1:
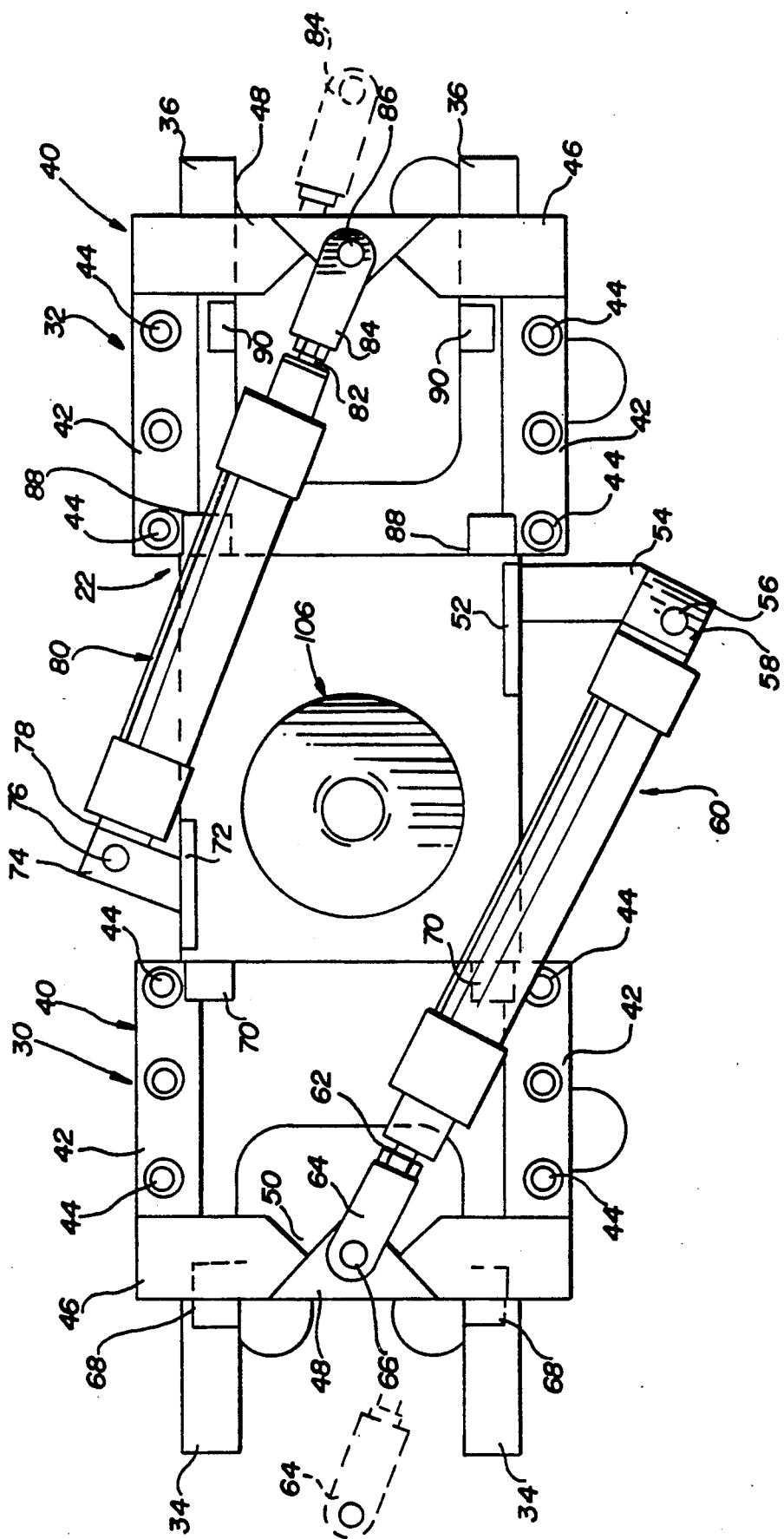
FIG. 1 is a bottom plan view of a labeller formed in accordance with this invention.

Referring now to FIGS. 1-4, it will be seen that there is illustrated the details of an in-mold labeller formed in accordance with this invention, the labeller being generally identified by the numeral 20. The labeller 20 includes a support member best shown in FIGS. 1-3 and identified by the numeral 22 The support member 22 includes a central mounting portion 24 and a pair of support legs 26, 28 extending in opposite directions. The support legs 26, 28, in turn, have slidably mounted thereon carriers 30, 32, respectively.

As will be best seen from FIG. 2, each of the support legs 26, 28 are generally U-shaped in outline so as to provide a pair of spaced slide members 34, 36, respectively. This facilitates the sliding movement of the respective carriers 30, 32 thereon.

The carriers 30, 32 are of like construction and each of the two carriers include a primary member in the form of a block 38 having a notched underside for having received therein the respective support leg 26 or 28.

Each of the carriers 30, 32 also include a lower member 40 which is best shown in FIG. 1. Each lower member 40 includes a pair of longitudinal bars 42 which are secured to the underside of the block 38 by way of fasteners 44 to form a slide assembly. The bars 42 are joined together by a transverse member 46 which, in turn, carries a lower bracket or ear 48. The transverse member 46 is notched as at 50 to provide clearance above a portion of the ear 48 as is best shown in FIG. 1.

In order to effect the movement of the carrier 30 on the support member 22, there is carried by the support member 22 a mounting plate 52 which has extending outwardly therefrom a bracket 54. The bracket 54 has coupled thereto by way of a fastener 56 a mounting bracket 58 of an extensible fluid motor 60. The fluid motor 60 also includes a piston rod 62 which carries a bifurcated fitting 64 which is pivotally connected to the ear 48 by way of a pivot pin 66.

In order to limit outward movement of the carrier 30 on the support member 22, the support member 22 carries a pair of fixed stops 68 which are engageable by stop 70 carried by the carrier 30, as is best shown in FIG. 1.

In a like manner, the other side of the support member 22 is provided with a mounting plate 72 which carries a bracket 74 to which there is pivotally connected by way of a pivot pin 76 a mounting ear 78 on the end of a second extensible fluid motor generally identified by the numeral 80. The fluid motor 80 includes a piston rod 82 which carries a bifurcated fitting 84 which is connected by way of a pivot pin 86 to the associated ear 48.

At this time it is pointed out that the stroke of the fluid motor 80 is less than that of the fluid motor 60 as is the travel of the carrier 32 as compared to the carrier 30. The carrier 32 carries suitable stops 88 which are engageable with stops 90 carried by the support member 22 to limit the outward movement of the carrier 32.

As is best shown in FIGS. 2 and 3, each of the blocks 38 carry mounting fittings 92 which, in turn, has extending therefrom a length of pipe 94 which carries a suction head 96 which may incorporate a suitable bellows 98. Each of the blocks 38 is provided with internal passages (not shown) which connect an inlet 100 to each of the fittings. The inlets 100 are connected to a vacuum source (not shown) by way of a conventional type of control (not shown).

Figure 4:
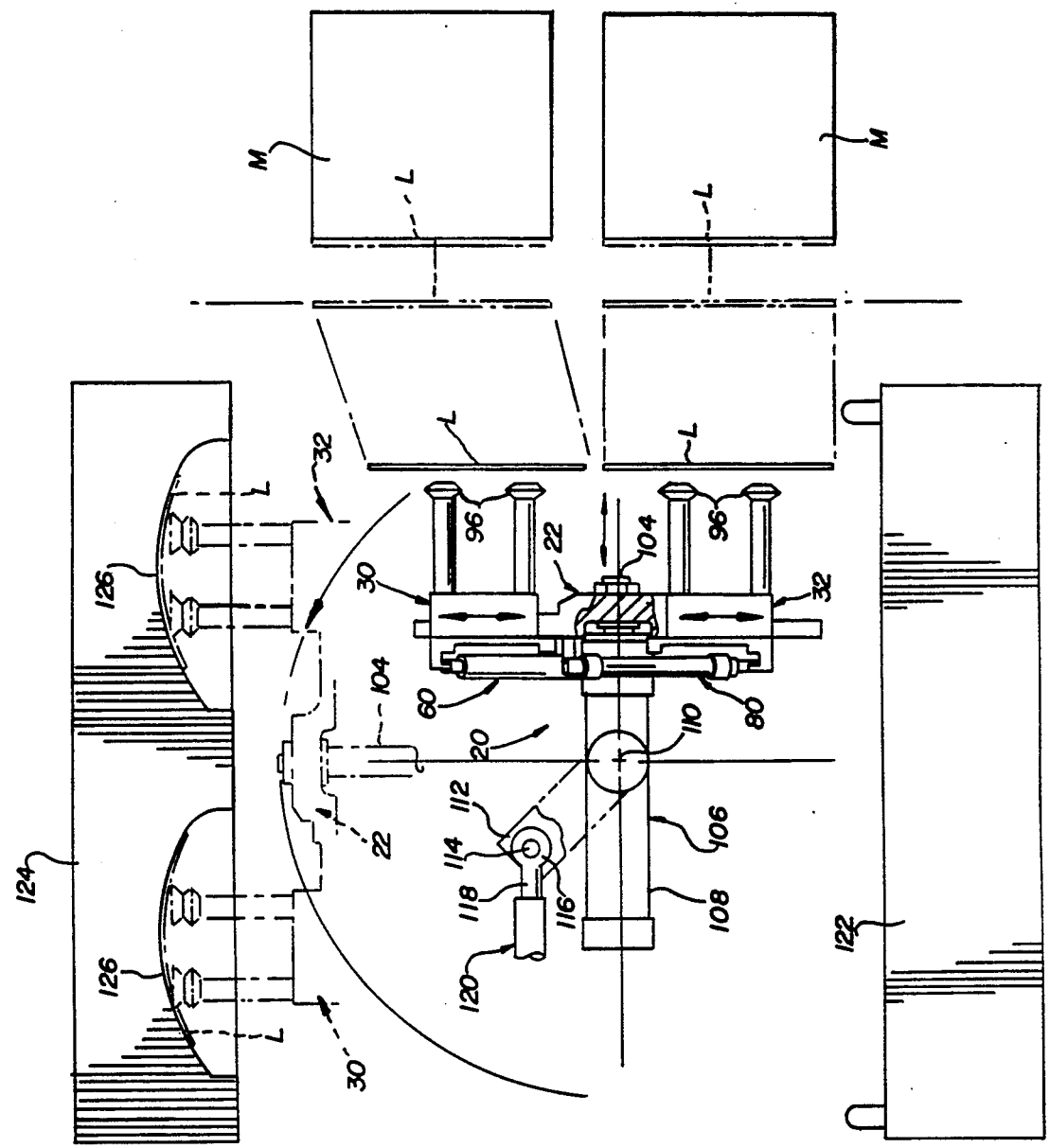
FIG. 4 is an elevational view taken between an open mold and schematically shows how two labels are simultaneously placed within an upper mold half in accordance with this invention.

The central portion 24 of the support member 22 is offset as is best shown in FIG. 3 and is provided with a bore 102 which receives a piston rod 104 of an extensible fluid motor generally identified by the numeral 106 as is best shown in FIG. 4. The fluid motor 106 includes a cylinder 108 having a pivotal mount (not shown) mounting the fluid motor 106 for pivoting about an axis 110. The pivotal mount includes a control arm 112 which has connected thereto by way of a pivot pin 114 a bifurcated end 116 of a piston rod 118 of yet another extensible fluid motor 120.

Reference is now made to FIG. 4 wherein it will be seen that the labeller 20 is mounted with respect to open mold halves 122, 124. In a preferred usage of the labeller 20, the mold halves 122, 124 form one mold of a plurality of molds of a blow molding machine wherein the molds are mounted in a ferris wheel like arrangement. In such a molding apparatus, the inner mold (mold 122) is stationary and the outer mold (mold 124) is radially movable between a closed position cooperating with the inner mold 122 and an open position as shown in FIG. 4. The mold halves 122, 124 move along a predetermined path of travel.

It is to be understood that each of the mold halves 122, 124 is part of a dual cavity mold with the cavities being identified by the numeral 126. It will be seen that the cavities 126 must be spaced apart within their respective mold halves and that the total width of labels L as they are being applied to the cavities 126 are such that they cannot be moved into the limited space between the open mold halves 122, 124, rotated into alignment with the cavities 126 and then moved into the cavities. The construction of the labeller 20 overcomes this deficiency.

Referring further to FIG. 4, it will be seen that labels L are provided in stacks within a pair of side-by-side label magazines generally identified by the letter M. A lowermost one of the magazines M is positioned so that a label dispensed therefrom will be disposed only slightly above the face of the mold half 122. On the other hand, the construction of the magazines M is such that the spacing between labels L in two stacks is too great to enter in between the rotating mold halves 122, 124.

In accordance with this invention, when the labels are to be deposited into the cavities 122 of the outer mold half 124, the support member 22 is vertically disposed with the carrier 30 disposed uppermost. Further, the lower carrier 32 is positioned in horizontal alignment with the lower of the magazines M as is clearly shown in FIG. 4. When labels L are to be picked up from the magazines M, as the fluid motor 106 is actuated to move the pickup heads 96 into engagement with the labels L within the magazines M, while the carrier 32 remains stationary, the fluid motor 60 is actuated to move the carrier 30 upwardly into alignment with the labels L carried by the upper magazines M. This is schematically shown in FIG. 4.

Figure 5:
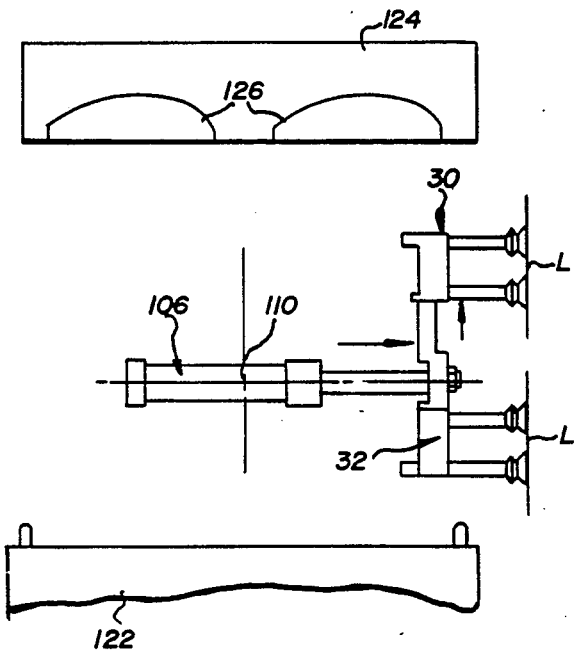
FIGS. 5-8 are schematic elevational views similar to FIG. 4 showing the sequence placing labels within cavities of an outer or upper dual cavity mold half.
Figure 6:
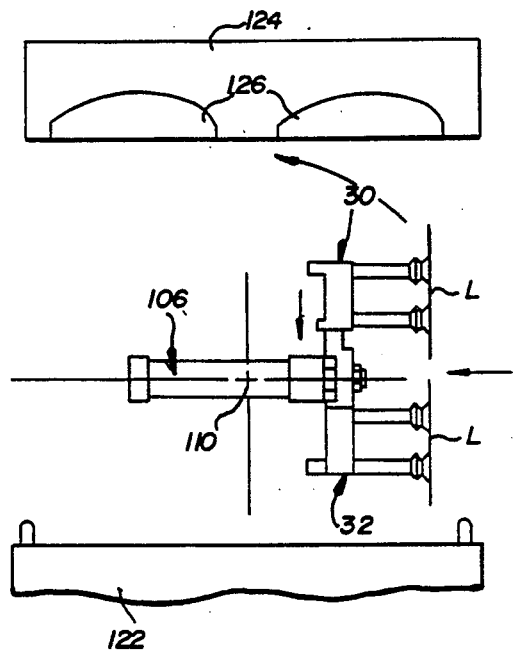
Figure 7:
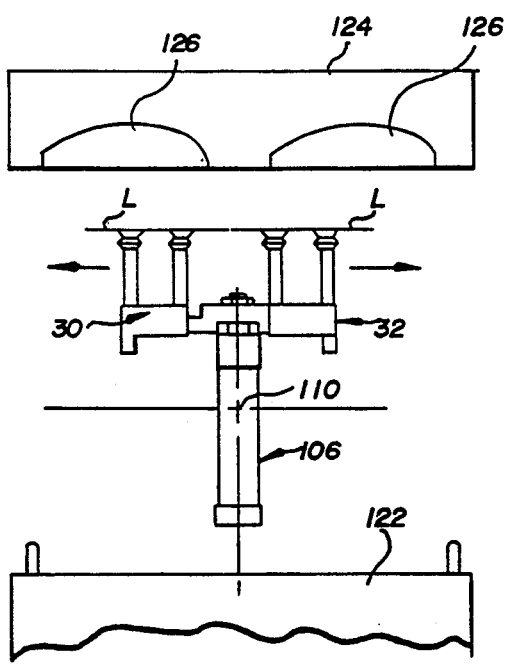

When the labels L are picked up, and as the labeller retracts from the magazines M, the fluid motor 60 is again actuated so as to move the carrier 30 down and thus move the upper labels L down to the position closely adjacent the lower labels L as is also shown in FIG. 4. The spacing of the labels L is now one which permits turning or rotation of the labeller to align the labels L with the cavities 126 as is schematically shown in FIG. 7. At this time it is pointed out that the label pickup is schematically shown in FIG. 5 while the movement of the upper label towards the lower label is clearly shown in FIG. 6.

Figure 8:
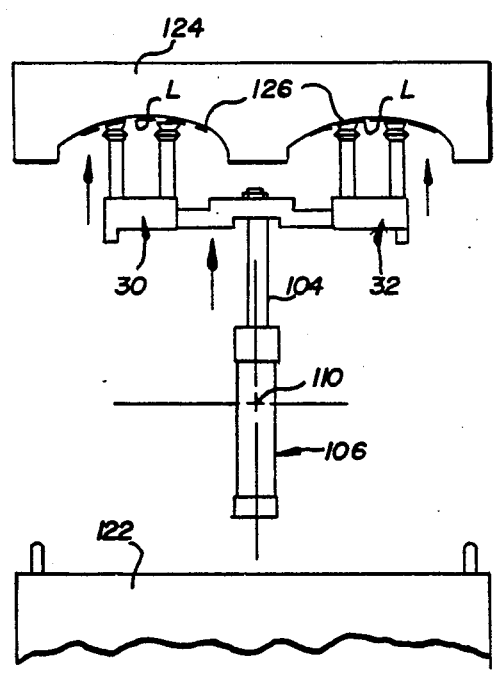

As is shown in FIG. 7, when the labels L are brought into position generally opposing the outer mold 124, the labels L are closely adjacent one another and not aligned with the cavities 126. The fluid motors 60, 80 are then actuated as is schematically shown in FIGS. 7 and 8 to move the labels L apart and into alignment with the cavities 126. The fluid motor 106 is then actuated to advance the carriers 30, 32 towards the respective cavities 126 and to position the labels within the respective cavities 126.

At this time it is pointed out that, as is old in the art, the pickup heads 96 are suction heads and starting with the time that a label is to be picked up by the pickup heads 96, a vacuum is drawn in the pickup heads and this vacuum is maintained until the labels L are positioned within the respective cavities 126 at which time the vacuum is discontinued and, preferably, air under pressure is directed to the pickup heads 96 to force the labels against the surfaces of the cavities 126. In a like customary manner, the cavities 126 may have associated therewith suitable vacuum means for maintaining the labels L positioned therein.

Figures 9, 10:
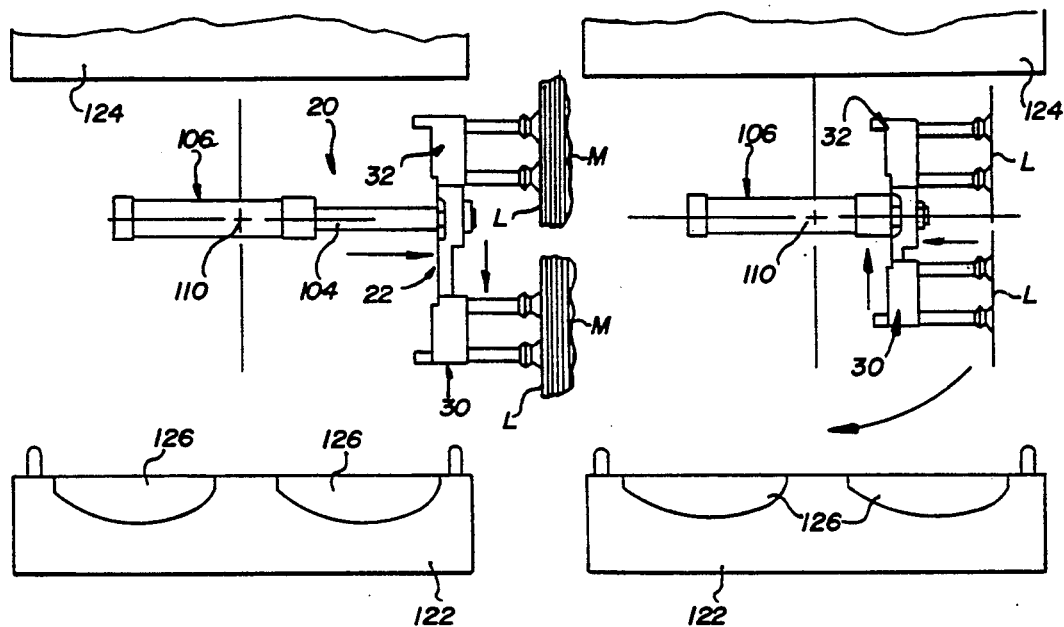
FIGS. 9-12 are schematic elevational views similar to FIGS. 5-8, respectively, and shows the manner in which the labeller applies two labels to a dual cavity lower or inner mold half.
Figures 11, 12:
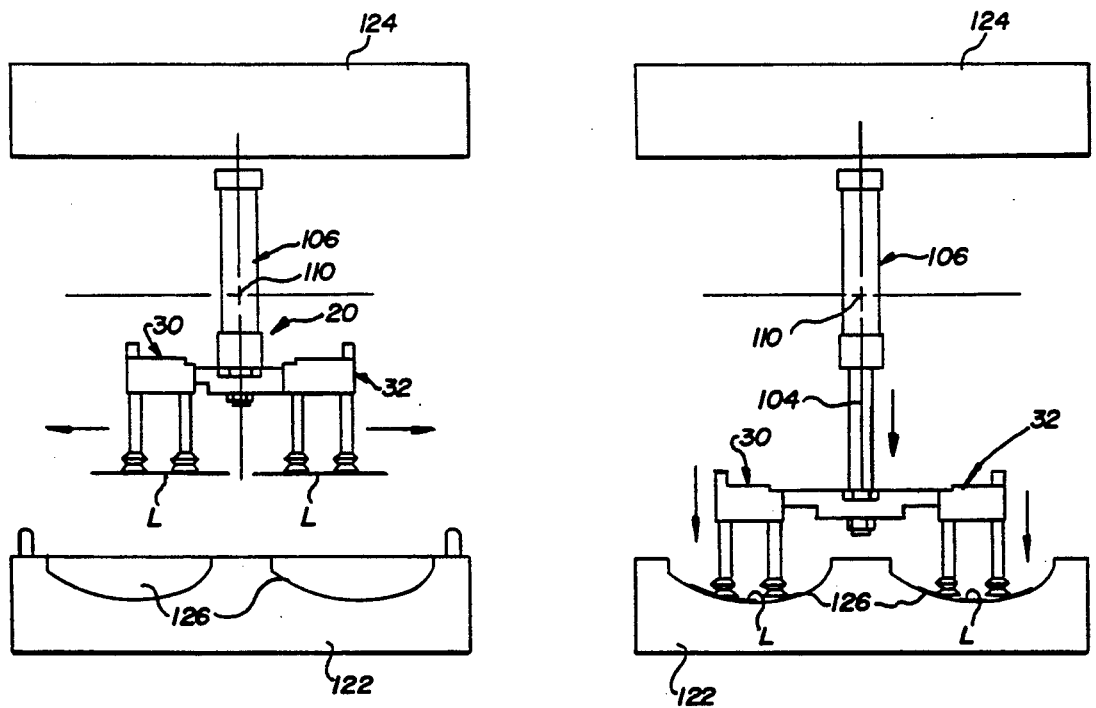

Reference is now made to FIGS. 9-12 which are similar to FIGS. 5-8, respectively, but relate to the placing of labels within the dual cavity inner mold half 122. First of all, it will be seen that the pivot axis 110 for the fluid motor 106 is closer to the inner mold half 122 in FIGS. 5-8 while it is closer to the outer mold half 124 in FIGS. 9-12. Further, it will be seen that the position of the support member 22 has been rotated 180° in FIG. 9 from its position of FIG. 5 so that the carrier 30, which was previously uppermost, is now lowermost while the carrier 32 is disposed uppermost. Further, it will be seen that the magazines M are disposed more closely adjacent the outermost mold half 124, in relationship the opposite of that shown in FIG. 4. In addition, as is best shown in FIG. 10, the fluid motor 106 is rotated in a clockwise direction to apply the labels L as opposed to the counterclockwise direction shown in FIG. 6. Other than this, the operation of the label 20 to apply the labels L to the inner mold half 122 is basically the same as that previously described with respect to the application of labels to the outer mold half 124.

At this time it is also particularly pointed out here that FIGS. 5-12 are schematic views and that while the fluid motor 106 is illustrated in each of these views, for purposes of clarity, the fluid motors 60, 80 and 120 have been amended.

Although only a preferred embodiment of the labeller has been specifically illustrated and described herein, it is to be understood that minor variations may be made in the construction of the labeller without departing from the spirit and scope of the invention as defined by the appended claims.

We claim:

1. An in-mold labeller for applying two labels simultaneously to two cavities of a mold half of a dual cavity mold having two mold halves wherein the total width of two labels in said dual cavity mold is greater than a spacing of said mold halves when open, said labeller comprising a dual stack label magazine, and a transfer device for transferring labels from said magazine to each cavity of said dual cavity mold half, said transfer device comprising a support member, an extensible fluid motor supporting said support member for retraction and projection, pivot support means mounting said extensible fluid motor for selectively presenting said support member to said magazine and to a mold half, pivot means for pivoting said extensible fluid motor, a pair of separate carriers guidedly mounted on said support member for movement together and apart, separate actuator means carried by said support member and coupled to said carriers for effecting controlled movement of said carriers on said support member, and each carrier carrying label pickup heads.

2. A labeller according to claim 1 wherein said actuator means are extensible fluid motors.

3. A labeller according to claim 1 wherein said actuator means have means for providing different carrier movements.

4. A labeller according to claim 1 wherein said actuator means are linear actuator means and have different strokes.

5. A labeller according to claim 3 wherein said actuator means are linear actuator means and have different strokes.

6. A labeller according to claim 3 wherein during label pickup, means are provided moving only one of said carriers.

7. A labeller according to claim 3 wherein in a retracted position of said carriers one of said carriers is closer to an axis of said extensible fluid motor than the other.

8. A labeller according to claim 1 wherein said pivot support means has an axis positioned between a path of open mold halves, and said axis is positioned farthest from that mold half path of the mold half to which labels are to be applied.

9. An in-mold labeller for applying labels to a dual cavity mold half wherein a width of a pair of labels when in a mold receiving position is greater than that permitted by a spacing between open mold halves, said labeller comprising (a) lifting means for picking up two adjacently positioned labels, (b) sliding means, coupled to said lifting means, for moving said labels together relative to one another and between the cavities of open mold halves, (c) rotating means, coupled to said sliding means, for pivoting each of said labels between the mold halves to face a selected one of said mold half's cavities, (d) extension means, coupled to said sliding means, for moving the labels apart relative to one another, and (e) placing means, coupled to said lifting means, for moving the labels towards their selected cavities of said mold half and depositing the labels in said cavities of said mold half.

* * * * *